(12) United States Patent
Kleinikkink et al.

(10) Patent No.: US 9,828,191 B2
(45) Date of Patent: *Nov. 28, 2017

(54) CONVEYOR BEARING SYSTEM

(71) Applicant: ATS AUTOMATION TOOLING SYSTEMS INC., Cambridge (CA)

(72) Inventors: Albert John Kleinikkink, Cambridge (CA); Donald James Mowat, Cambridge (CA); Ryan Lloyd Willis Arthur Scott, Cambridge (CA)

(73) Assignee: ATS AUTOMATION TOOLING SYSTEMS INC., Cambridge, Ontario ( * ) Notice: Subject to any disclaimer, the term of this patent is extended or adjusted under 35 U.S.C. 154(b) by 88 days.

This patent is subject to a terminal disclaimer.

(21) Appl. No.: 15/249,927

(22) Filed: Aug. 29, 2016

(65) Prior Publication Data

US 2016/0368718 A1    Dec. 22, 2016
US 2017/0247200 A9    Aug. 31, 2017

Related U.S. Application Data

(63) Continuation of application No. 14/445,587, filed on Jul. 29, 2014, now Pat. No. 9,428,347.

(60) Provisional application No. 61/859,481, filed on Jul. 29, 2013.

(51) Int. Cl.
    *B65G 54/02*    (2006.01)
(52) U.S. Cl.
    CPC .................... *B65G 54/02* (2013.01)
(58) Field of Classification Search
    CPC .... B65G 21/2009; B65G 21/22; B65G 23/18; B65G 23/23; B65G 54/02; B65G 17/46
    See application file for complete search history.

(56) References Cited

U.S. PATENT DOCUMENTS

| | | | |
|---|---|---|---|
| 4,800,818 | A | 1/1989 | Kawaguchi et al. |
| 4,823,939 | A | 4/1989 | Langhans et al. |
| 5,027,942 | A | 7/1991 | Wallaart |
| 6,191,507 | B1 | 2/2001 | Peltier et al. |
| 6,326,708 | B1 | 12/2001 | Tsuboi et al. |
| 6,543,609 | B2 | 4/2003 | Layne et al. |

(Continued)

OTHER PUBLICATIONS

Bosshard, Neues Anriebssytem fur den Materialfluss, Hebezeuge und Foerdermittel, Issue No. 11-12, Nov. 1, 2004.

(Continued)

*Primary Examiner* — Gene Crawford
*Assistant Examiner* — Keith R Campbell

(57) ABSTRACT

There is provided a conveyor system including: a track comprising a first magnetic element; and a moving element comprising a second magnetic element for interacting with the track to provide a magnetic force that retains the moving element on the track; wherein absent the magnetic force, the moving element is released from the track. In another aspect, there is provided a conveyor system that includes: a track having at least one guide rail; and a moving element; wherein a magnetic force controls movement of the moving element in a direction of travel and the magnetic force supports the moving element in a second direction perpendicular to the direction of travel; and wherein the at least one guide rail supports the moving element in a third direction perpendicular to both the direction of travel and the second direction.

20 Claims, 14 Drawing Sheets

(56) References Cited

U.S. PATENT DOCUMENTS

| | | |
|---|---|---|
| 8,397,896 B2 | 3/2013 | Kleinikkink et al. |
| 8,430,233 B2 | 4/2013 | Fischer et al. |
| 8,794,426 B2 | 8/2014 | Cooke |
| 9,428,347 B2* | 8/2016 | Kleinikkink ........... B65G 54/02 |
| 2005/0061195 A1 | 3/2005 | Lutz et al. |
| 2006/0232141 A1 | 10/2006 | Teramachi et al. |
| 2007/0028796 A1* | 2/2007 | Lin ....................... B65G 35/00 104/172.3 |
| 2012/0186948 A1 | 7/2012 | Ishino et al. |
| 2013/0026011 A1* | 1/2013 | van de Loecht ....... B65G 54/02 198/800 |
| 2015/0041288 A1 | 2/2015 | Van De Loecht et al. |
| 2015/0048693 A1 | 2/2015 | Prussmeier |

OTHER PUBLICATIONS

Patent Co-Operation Treaty Third Party Observation, submitted on PCT/CA2014/050717, Nov. 27, 2015.

Canadian Intellectual Property Office as International Searching Authority, International Search Report and Written Opinion on PCT Appln. No. PCT/CA2014/050717, Oct. 29, 2014.

U.S. Non-Final Office Action on U.S. Appl. No. 14/445,587, dated Apr. 7, 2015.

U.S. Final Office Action on Appln. No. 14/445,587, dated Sep. 4, 2015.

U.S. Non-Final Office Action on U.S. Appl. No. 14/445,587, dated Dec. 31, 2015.

* cited by examiner

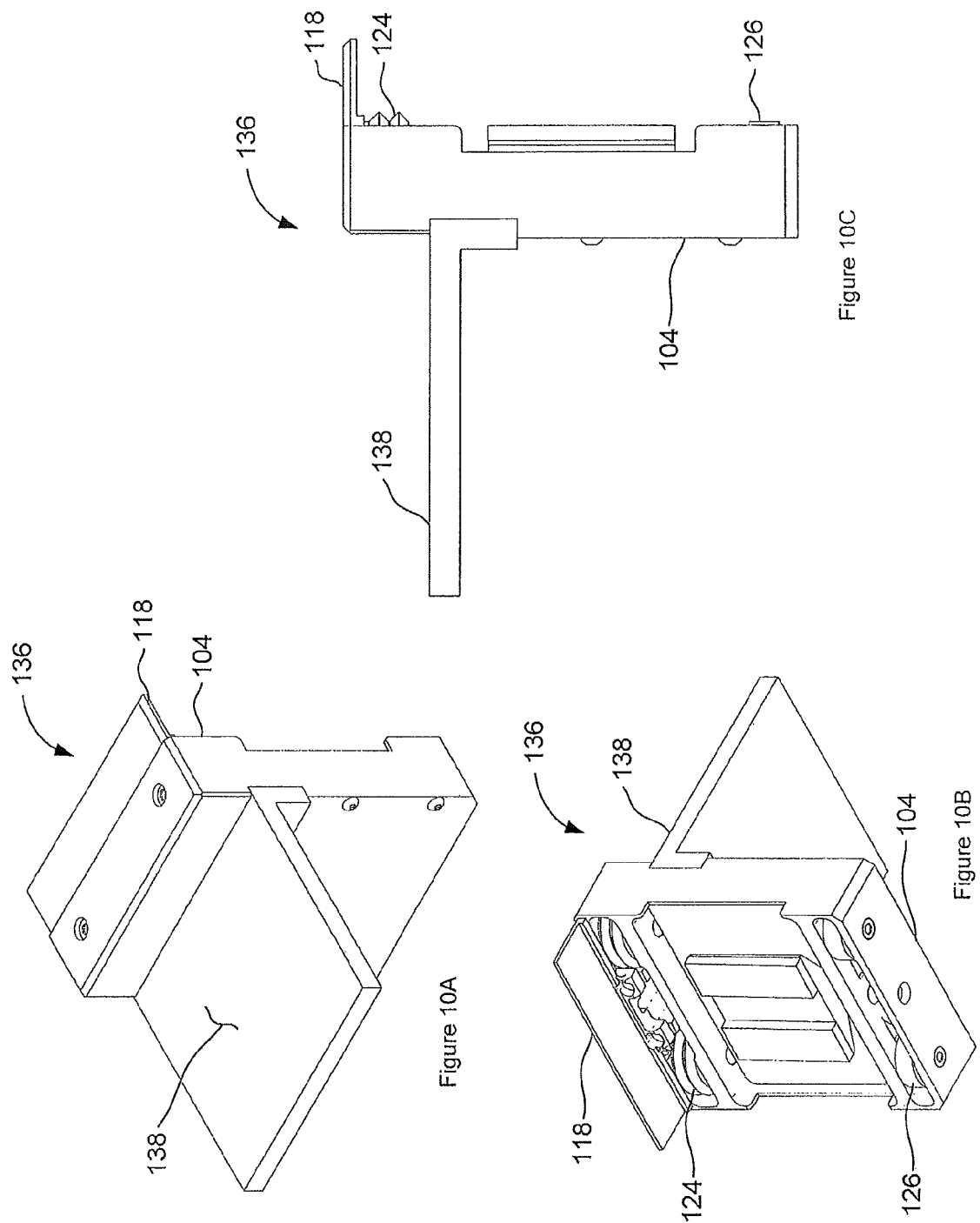

CONVEYOR BEARING SYSTEM

FIELD

The present disclosure relates generally to conveyor bearing systems for supporting moving elements and, more particularly, bearing systems used in linear motor conveyors.

BACKGROUND

In conventional linear motor systems, a moving element is controlled to move along a track by electromotive force. In a moving magnet linear motor, the moving element typically includes a magnet that holds the moving element to the track. In order to allow movement the moving element generally has bearings which run along the track and is supported by guide rails or the like on the track. The guide rails may engage with the bearings or with the moving element itself. The bearings include plain bearings, ball bearings, needle bearings, roller bearings and the like. In conventional systems, it can be difficult to remove the moving elements from the track either because of the magnetic attraction or because of bearing engagement with the track or guide rails.

In conventional systems, bearings may have specific parallelism tolerances. If the conventional bearings do not meet these tolerances the bearings may be prone to binding during movement.

Conventional bearings are typically not able to move well on curvilinear profiles. While some bearing configurations exist that can move along curved profiles, they are generally costly, difficult to manufacture, and have flexibility constraints with regard to the curvilinear profiles.

Conventional bearings are often preloaded with preloading hardware and have preloading adjustments to ensure the bearings stay in positive contact with the guide rails.

Conventional bearings may have difficulty in achieving high precision, accurate, and repeatable movement along the direction of motion. Factors that may cause variability in precision include i) component manufacturing tolerances, ii) backlash or play, iii) how well the bearings are seated on the guide rail datum surfaces, and iv) the accuracy of the moving element position measuring system. Where backlash or play is the clearance caused by gaps between components or parts.

FIGS. 1, 2, and 3 show example conventional bearing systems. FIG. 1 shows a plain bearing system 10 with a moving element 12 and bearings 14 that are held onto guide rails 16 by the shape of the guide rail 16. FIG. 2 shows a bearing system 20 with a moving element 22 having V wheel bearings 24 held onto guide rails 26. FIG. 3 shows a bearing system 30 with a moving element 32 having recirculating ball bearings 34 held onto guide rails 36. The recirculating ball bearings 34 are around the guide rails 36 and have ball bearings which roll on the guide rails 36. If a moving element on a conventional system were to require inspection, maintenance, or replacement, the conventional guide rails would generally need to be disassembled or opened. The systems 10, 20, 30 may require mechanical disassembly of any of the moving element 12, 22, 32, the bearings 14, 24, 34, and the guide rails 16, 26, 36, in order to remove the moving element 12, 22, 32 from the guide rails 16, 26, 36. The conventional systems in FIGS. 1, 2, and 3 may require preloading or tight manufacturing tolerances on guide rails and bearings to achieve precise movement and positioning. The systems 10, 20, 30 may also be susceptible to binding if the rails are not parallel.

SUMMARY

It is an object of the present disclosure to obviate or mitigate at least one disadvantage of previous systems.

It may be desirable for a bearing system to have a moving element with bearings that are easily removable from guide rails of a track. The bearing system would be intended to be viable for curvilinear profiles, tolerant to variations in the parallelism of the guide rails, not need preloading adjustments, and cost effective for high precision positioning.

In an aspect, the present disclosure provides a conveyor system including: a track comprising a first magnetic element; and a moving element comprising a second magnetic element for interacting with the track to provide a magnetic force that retains the moving element on the track; wherein absent the magnetic force, the moving element is released from the track.

In a particular case, the conveyor system further includes a first bearing provided to the moving element, wherein the track comprises a first guide rail that supports the moving element and the first bearing engages with the first guide rail.

In a particular case, the magnetic force laterally retains the moving element on the track.

In a particular case, the moving element includes: a second bearing with a flat profile for engaging a second guide rail.

In a further particular case, the first guide rail has a "V" or "U" shaped profile.

In a further particular case, the second bearing includes at least one wheel bearing.

In a further particular case, the first bearing, the second bearing, or both, include a set of bearings.

In a further particular case, the moving element is removed when the magnetic force is overcome without mechanical disassembly.

In a further particular case, the track and guide rails are curved.

In a particular case, the magnetic force is continuously adjusted to capture the moving element on the track.

In a particular case, the magnetic force is adjusted to move the moving element on the track.

In a further particular case, the magnetic force takes up mechanical backlash.

In a particular case, the first guide rail has an angled end for mating with a guide rail of an adjacent track section.

In a further particular case, variation in the guide rails does not cause binding.

In another aspect, there is provided a conveyor system that includes: a track having at least one guide rail; and a moving element; wherein a magnetic force controls movement of the moving element in a direction of travel and the magnetic force supports the moving element in a second direction perpendicular to the direction of travel; and wherein the at least one guide rail supports the moving element in a third direction perpendicular to both the direction of travel and the second direction.

In a particular case, the moving element includes at least one set of bearings having a profile for engaging a corresponding profile of the at least one guide rail.

In a particular case, the at least one guide rail has a "V" or "U" shaped profile.

In a particular case, the moving element is removed when the magnetic force is overcome without mechanical disassembly.

In a particular case, the magnetic force is continuously adjusted to capture the moving element on the track.

In a particular case, the at least one guide rail has an angled end for mating with a guide rail of an adjacent track.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIGS. 10A, 10B, and 10C are top perspective, bottom perspective, and side views of a moving element having a working surface, in accordance with an embodiment;

DETAILED DESCRIPTION

Generally, the present disclosure provides a conveyor system with improved bearing system for supporting a moving element.

Figure 1:
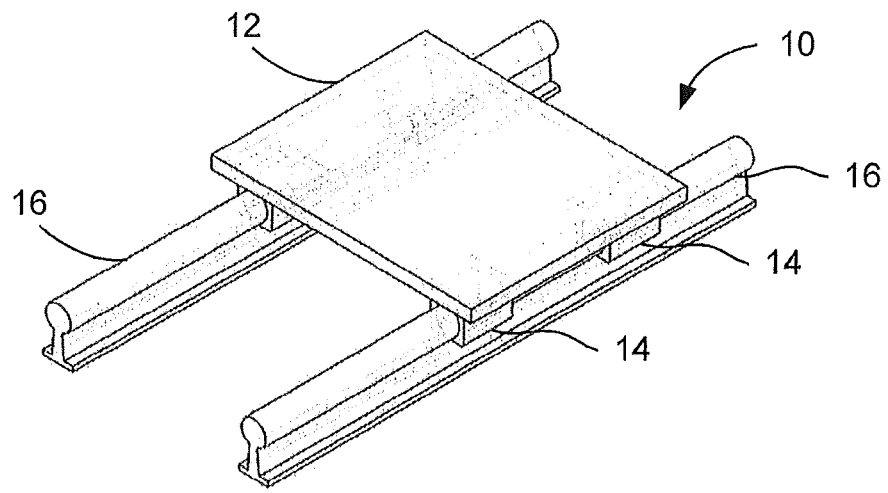
FIG. 1 is a conventional conveyor system with bearings and rails.
Figure 2:
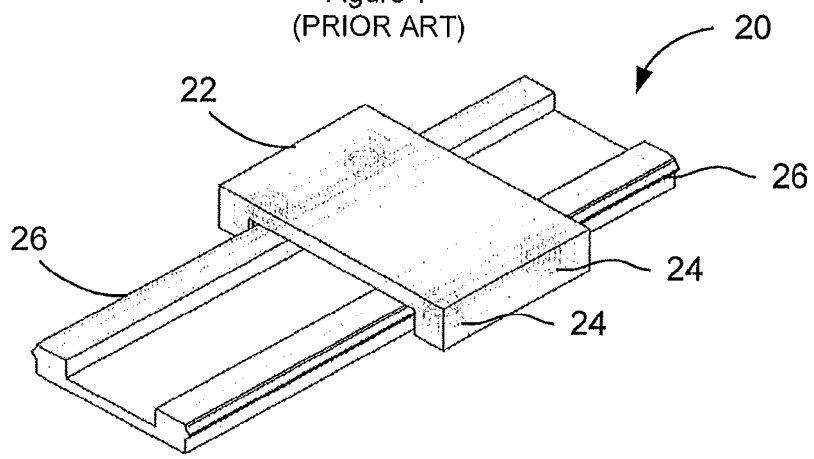
FIG. 2 is another conventional conveyor system with bearings and rails.
Figure 3:
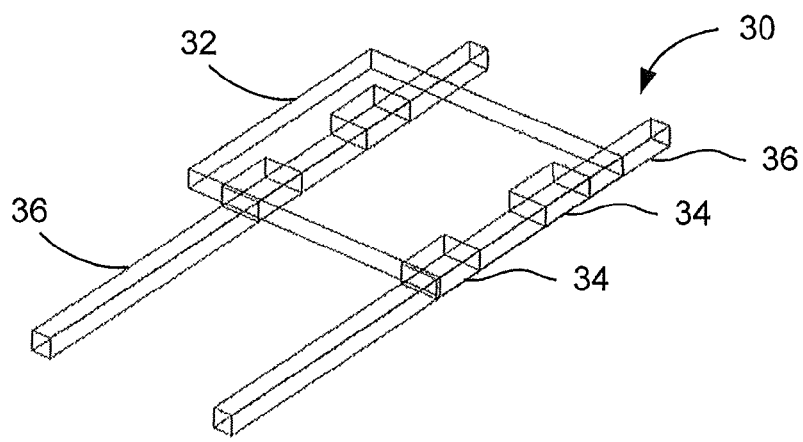
FIG. 3 is a conventional recirculating ball bearing conveyor system.
Figure 4:
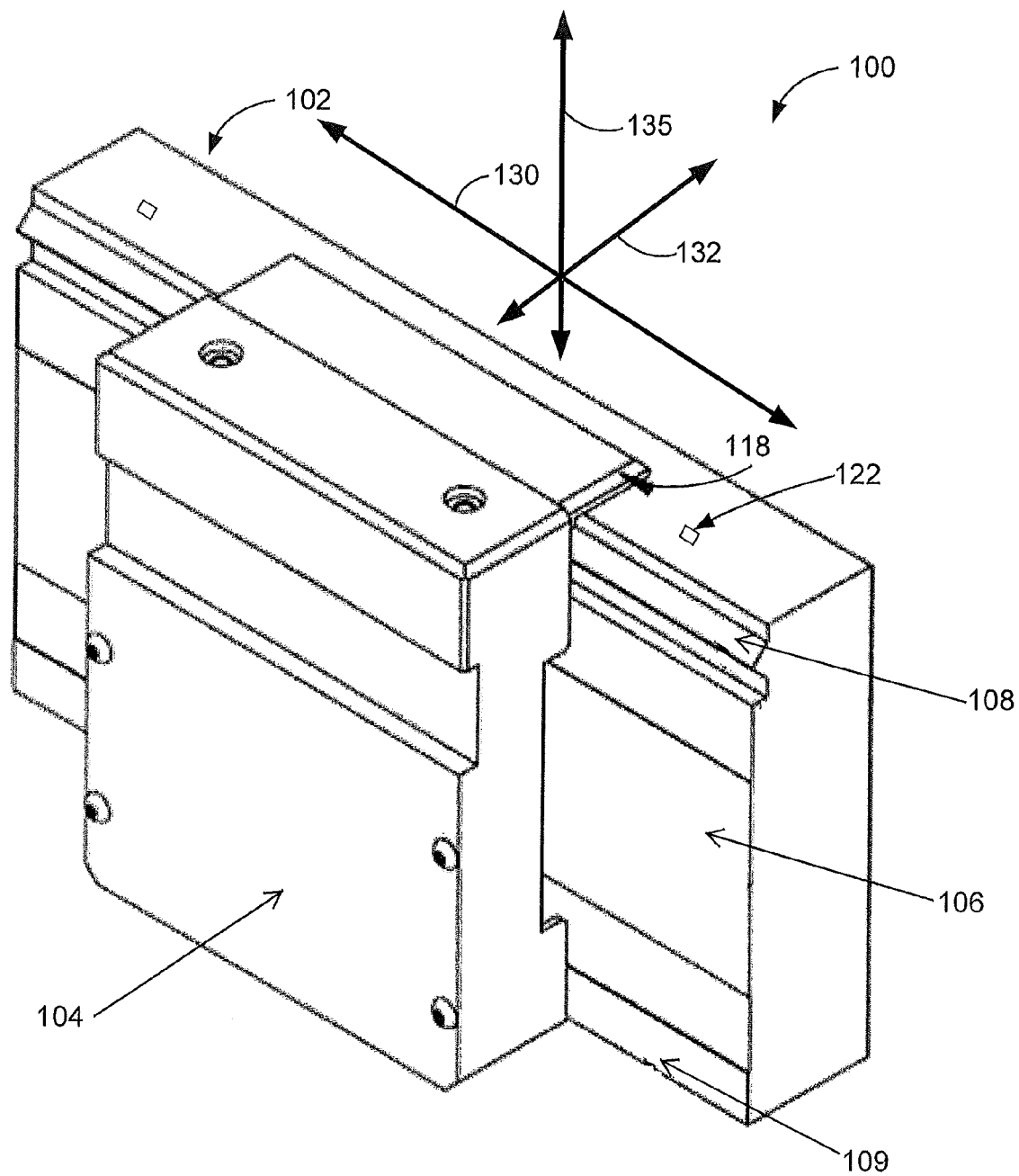
FIG. 4 is a track section of a conveyor system with a moving element, in accordance with an embodiment.

FIG. 4 illustrates a conveyor system 100 having a track section 102. The track section 102 features one or more moving elements 104 (only one is illustrated) which are configured to ride or travel along a track 106. Some of the principles of operation of a similar track section are described in more detail in U.S. Pat. No. 8,397,896 to Kleinikkink et al., which is hereby incorporated herein by reference.

The conveyor system 100 can be composed of a plurality of track sections 102 which are mechanically self-contained and separable from one another so as to be modular in nature. In this embodiment, the track sections 102 are mounted on a support (not shown) so as to align and abut one another in order to form a longer track. In order to be modular, each track section 102 may house self-contained electronic circuitry for powering and controlling the track section 102. The conveyor system 100 may include curved track sections 102.

Figure 5A:
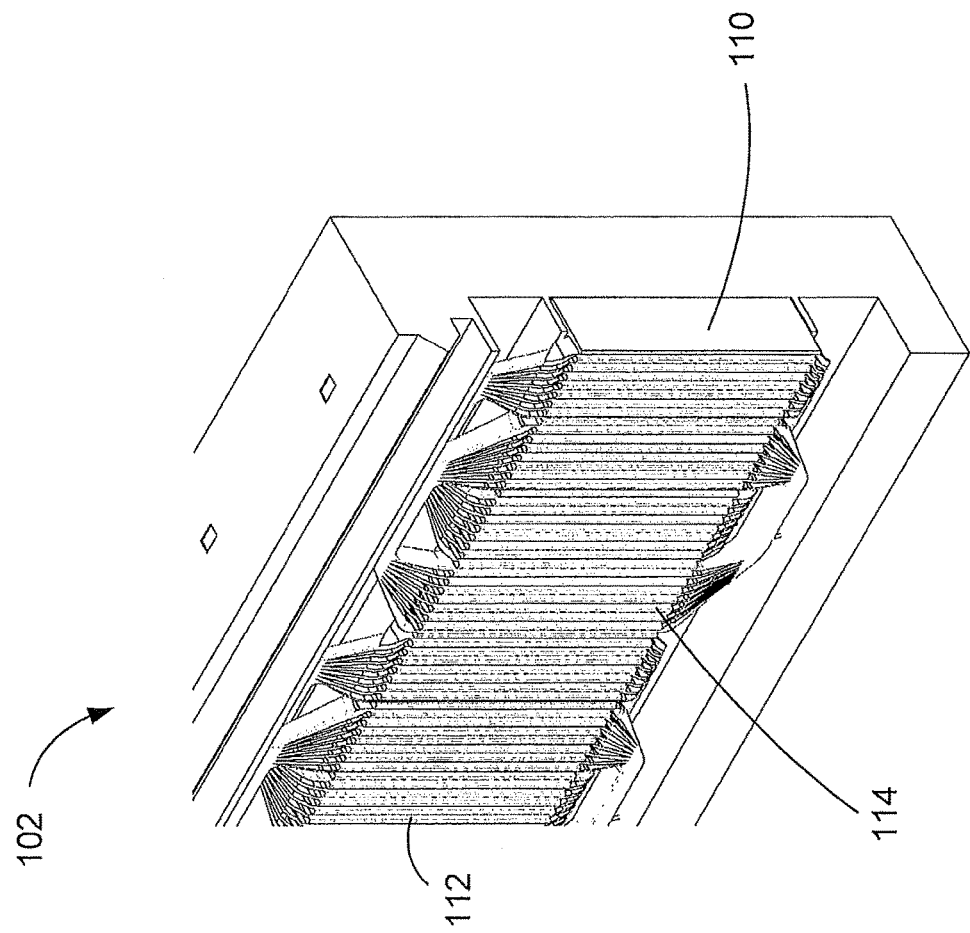
FIG. 5A is a perspective view of the track section of FIG. 4 having a cover removed to show a linear drive mechanism.
Figure 5C:
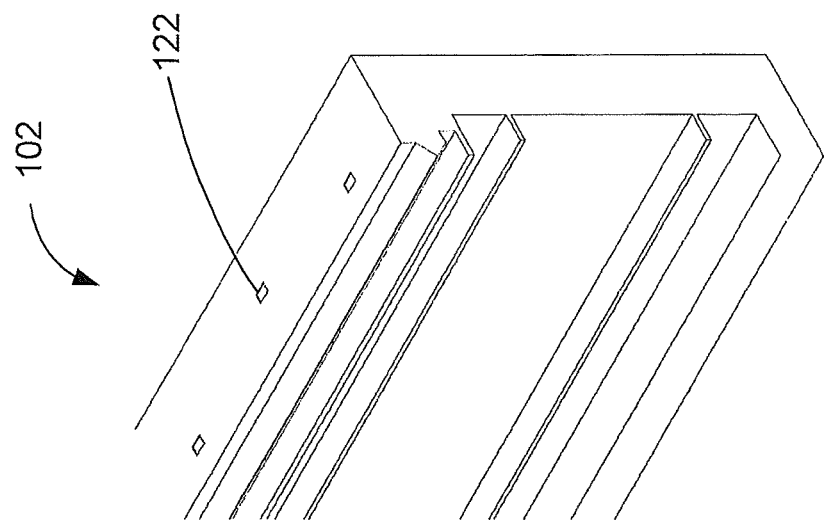
FIG. 5C is a perspective view of the track section of FIG. 4 with the linear drive mechanism removed.
Figure 5B:
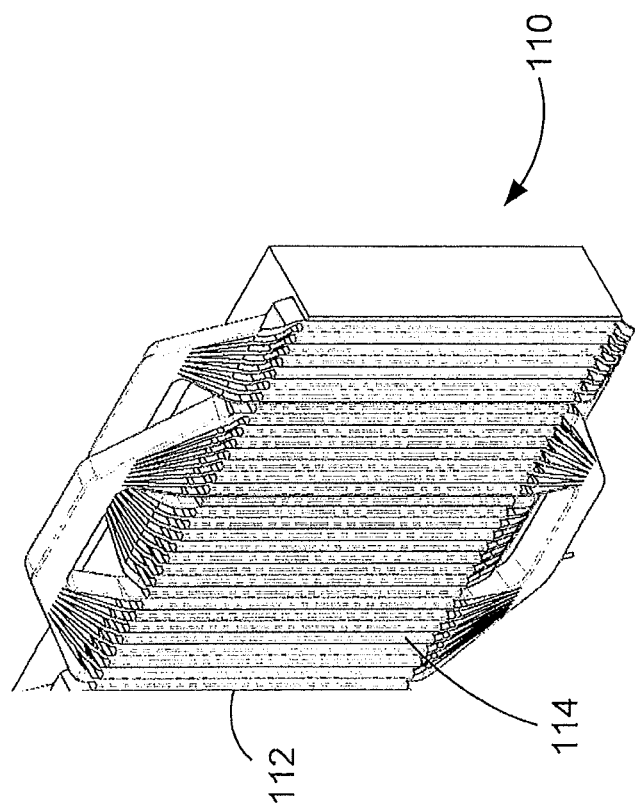
FIG. 5B is a perspective view of a linear drive mechanism of the track section of FIG. 4.

FIG. 5A illustrates a perspective view of the track section 102 with a cover plate removed to show a linear drive mechanism 110. FIG. 5B shows the linear drive mechanism 110 and FIG. 5C shows the track section 102 with the linear drive mechanism 110 removed. The linear drive mechanism 110 is formed as a stator armature 112 including a plurality of embedded coils 114 which are individually excited so that an electrically-induced magnetic flux produced by the stator armature 112 is located adjacent to a given moving element 104 to be controlled, in a direction normal thereto, without affecting adjacent moving elements 104. The motive force for translating each moving element 104 arises from the magnetomotive (MMF) force produced by each moving element 104 and the stator armature 112, i.e., by the tendency of the corresponding magnetic fluxes provided by the stator armature 112 and moving element 104 to align. A controller (described below) enables separate and independent moving MMFs to be produced along the length of the track section 102 for each moving element 104 so that each moving element 104 can be individually controlled with a trajectory profile that is generally independent of any other moving element 104. Structurally, the track section 102 may thus be broadly classified as a moving-magnet type linear brushless motor having multiple moving elements 104.

Referring again to FIG. 4, each moving element 104 includes an extension 118 provided with a machine readable medium 120 (not visible in FIG. 4). In this embodiment, the machine readable medium is a magnetic strip but may alternatively be another appropriate medium such as an optically transmissive or reflective strip, or another type of feedback system or the like. The extension 118 is configured such that the machine readable medium 120 interacts with sensors 122 provided to the track 106. The sensors 122 are configured to read the machine readable medium 120, whether magnetically, optically, or otherwise as appropriate. The machine readable medium 120 and sensors 122 form a position sensing system. The position sensing system may be arranged such that the position sensing system is protected from traffic on the track section 102 and dust and other debris. For example, the machine readable medium 120 is located on the bottom side of the extension 118.

The sensors 122 are located on the track section 102 and the machine readable medium 120 is located on the moving element 102. In an alternative, the sensors 122 may be located on the moving element 104 and the machine readable medium 120 may be located on the track section 102. The sensors 122 are configured to read a position of the moving element 104 on the track section 102 from the machine readable medium 120.

Figure 6:
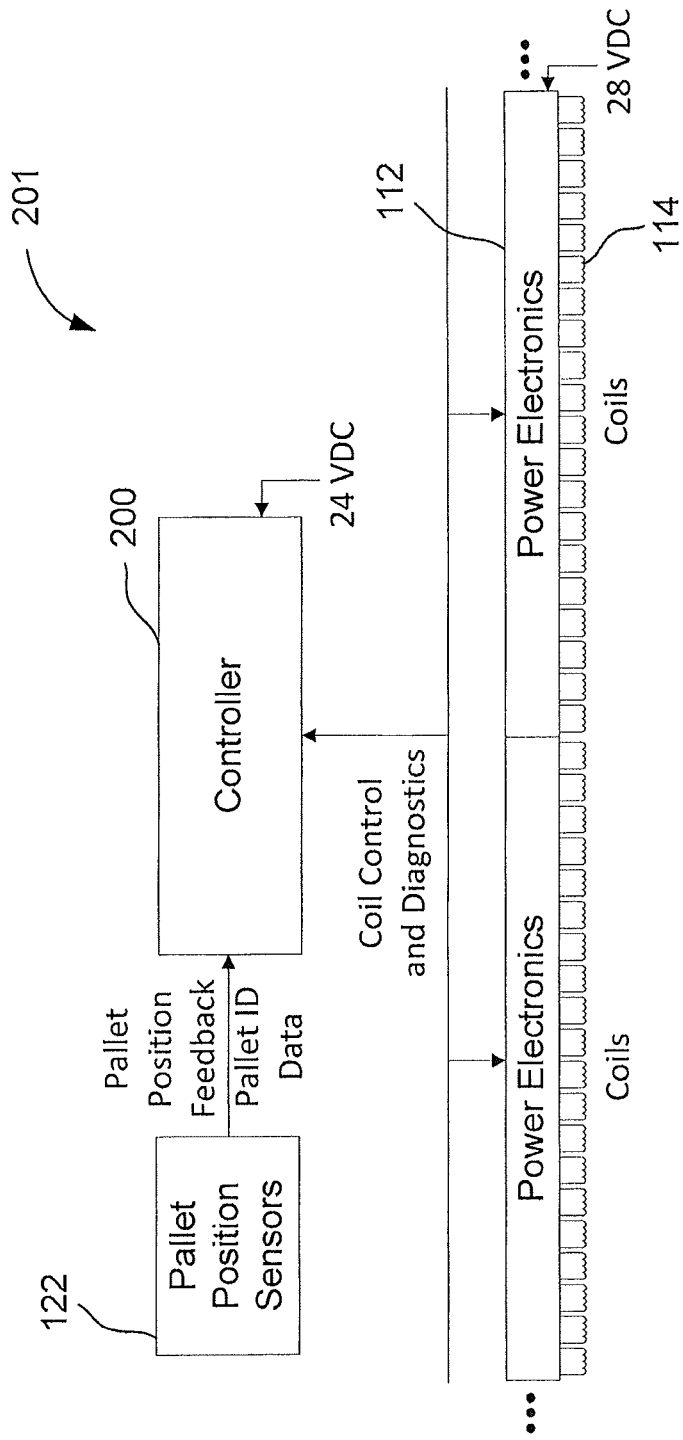
FIG. 6 is a block diagram of an example control architecture employed in the conveyor system.

FIG. 6 is a block diagram of an example control architecture 201 employed in the conveyor system 100. Controller 200 controls the overall conveyor system 100 and the track 102 used in the conveyor system 100. The controller 200 is configured to monitor moving element position and control the movement of moving elements 104 to go to desired destinations based on the moving element position. As such, the controller 200 can be used for process (i.e. manufacturing-line) control. The controller 200 may also provide a supervisory diagnostic role by monitoring the track sections 102 (e.g., by engaging in a continuous polling or pushing process) in order to determine the current status of any track section 102 and whether any track section 102 has failed. It will be understood that, in some cases, the controller 200 may directly control each of the track sections 102.

The controller 200 may also be connected to other devices, such as programmable logic controllers (PLCs) (not shown) via input/output (I/O) or network modules. The PLCs may provide manufacturing-line station-processing instructions to the track section 102, such as directing the next destination for a moving element 104 along the track 102, or providing station-specific motion instructions in respect of a given moving element 104.

As illustrated, the controller 200 is connected to the stator armature 112 and coils 114 in the track sections 102 and controls the coils 114 in accordance with an independent trajectory or "move" command for each moving element 104 located therein.

The controller 200 is also connected to the sensors 122 situated in the track section 102. The controller 200 is used to implement a closed-loop digital servo control system that controls movement of the moving element 104 by resolving the real-time position of each moving element 104 located in the track section 102. When the machine readable medium 120 of a given moving element 104 moves over a given sensor 122, moving element position feedback is transmitted to the controller 200. The controller 200 decodes the moving element position feedback to determine the position of the moving element 104.

Referring again to FIG. 4, the conveyor system 100 includes the track 106 that produces a magnetic force for moving the moving element 104 along the track 106. The magnetic force also captures the moving element 104 on the track 106. The magnetic force is created by the interaction of the magnetic flux created by the embedded coils 114 of the track 106 and magnetic elements 128 of the moving element 104. The magnetic force can be thought of as having a motive force component for directing movement of the moving element 104 along an X axis 130 (direction of travel) on the track 106, a capturing force component to hold, on a Y axis 132 (laterally), the moving element 104 on the track 106. In practice, the motive force and the capturing force is provided by the same magnetic flux elements 128.

The track 106 includes a first guide rail 108 and a second guide rail 109 configured to support the moving element 104. The first and second guide rails 108, 109 are designed such that the moving element 104 may be removed from the track 106 when the magnetic force is overcome. The magnetic force is overcome, for example, where a user pries the moving element 104 away from the track 106. In an alternative, the moving element 104 may be removed from the track 106 where the magnetic force is reversed, reduced, or removed.

The first guide rail 108 supports the moving element 104 vertically and horizontally. The first guide rail 108 may have a "V" shaped profile to support and guide the moving element 104 on the track 106. The second guide rail 109 supports the moving element 104 horizontally. The second guide rail 109 may be a smooth surface with a flat profile.

Figure 7:
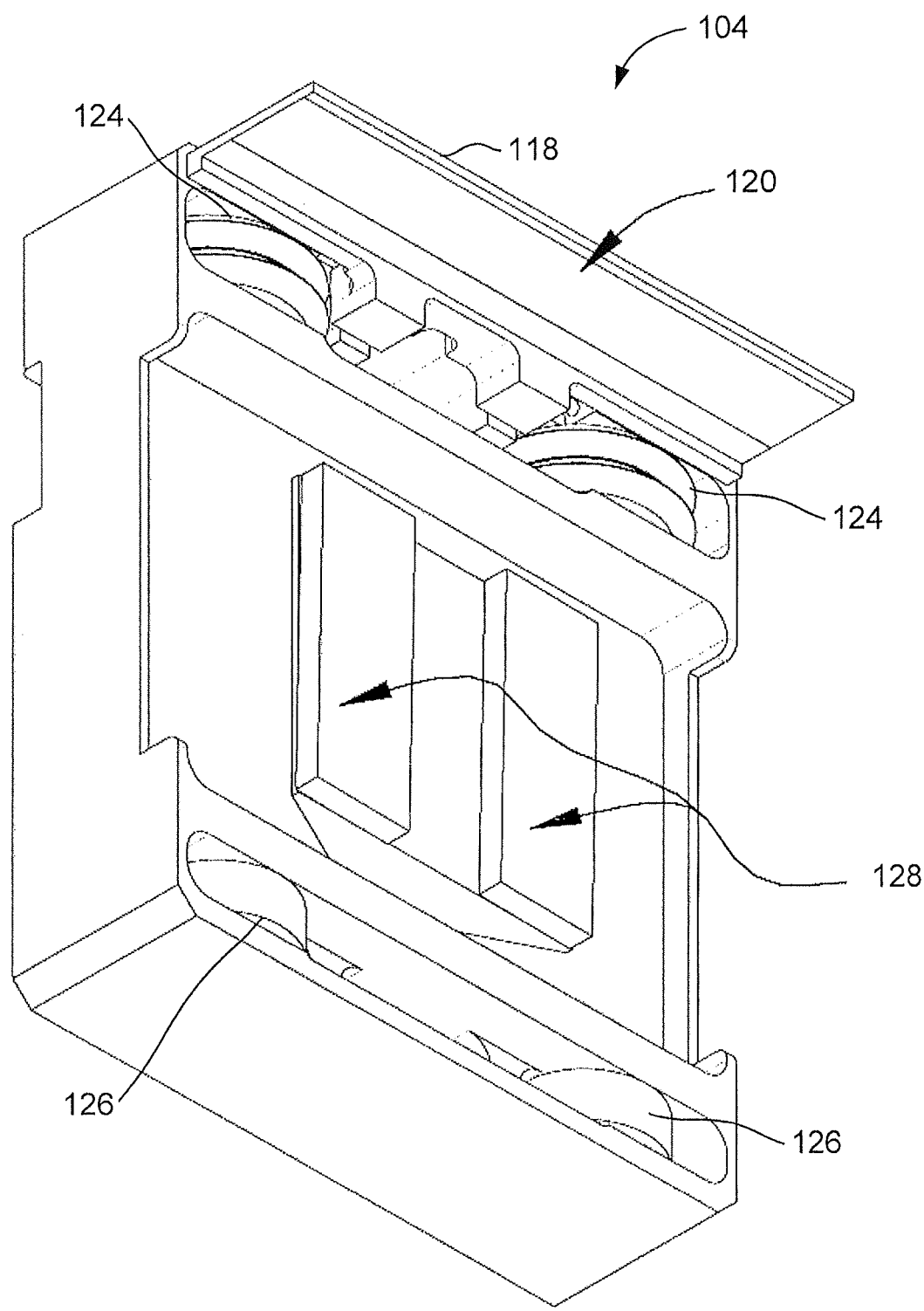
FIG. 7 is a perspective view of a moving element of the conveyor system of FIG. 4, in accordance with a first embodiment.

FIG. 7 shows an example of a moving element 104 with magnetic elements 128. The magnetic elements 128 provide a magnetic flux that corresponds to or interacts with the magnetic flux created by the coils 114 of the track 106. In some embodiments, the magnetic elements 128 may be permanent magnets.

The moving element 104 has a first set of bearings 124 and a second set of bearings 126. In this embodiment, the first set of bearings 124 is located above the second set of bearings 126. The first and second set of bearings 124, 126 may be wheel bearings that are rotatably attached to the moving element 104.

The first set of bearings 124 rides on the first guide rail 108. The first set of bearings 124 has an edge profile that corresponds to the profile of the first guide rail 108. In an embodiment, the first set of bearings 124 has a "V" shaped profile that matches the opposite "V" shape profile of the first guide rail 108. The first set of bearings 124 may alternately have a "U" shaped profile or another appropriately shaped profile intended to support the moving element 104 along a Z axis 135 (e.g., vertically, shown in FIG. 4). In certain cases, the moving element 104 has two bearings in the first set of bearings 124.

The second set of bearings 126 rides on the second guide rail 109. The second set of bearings 126 has an edge profile that corresponds to the profile of the second guide rail 109. In an embodiment, the second set of bearings 126 has a flat profile (e.g., a flat wheel) that matches the flat profile of the second guide rail 109. The second set of bearings 126 may roll a bit higher or lower on the second guide rail 109 to adapt to any non-parallelism with the first guide rail 108. In some cases, the second set of bearings 126 includes a plurality of bearings.

Higher precision may be achieved over conventional conveyors by supporting the moving element 104 with magnetic force and the first set of bearings 124 to control the moving elements 104 along the Y axis 132 and the Z axis 135 including position and rotation. In certain cases, the first set of bearings 124 precisely contains the moving element 104 along the Y axis 132 and the Z axis 135 and precisely contains pitch rotation (about the Y axis 132) and yaw rotation (about the Z axis 135). The first set of bearings 124 provides precise movement and positioning along the X axis 130.

The second set of bearings 126 contain rotation of the moving element 104 about the X axis 130. The second set of bearings 126 may be positioned at a distance from the guide rail 108 to minimize variability due to rotation about the X axis 130 on the working surface 138. The bearings 126 and the guide rail 109 may have tight tolerances on the dimensions that impact rotation about X axis 130 to allow precise positioning of the moving element 104 in rotation about the X axis 130.

In the embodiment shown in FIG. 7, the moving element 104 has two "V" shaped bearings 124 and two flat bearings 126. The two flat bearings 126 and the two V-shaped bearings 124 (four bearings in total) may provide increased stability in rotation about the Z axis 135 or the X axis 130. This may allow payloads mounted to the moving element 104 that have higher cantilever than a three bearing configuration. With four bearings 124, 126, the center of gravity of an added payload that is mounted to the moving element 104 may be shifted farther away from the track 106.

Figure 8:
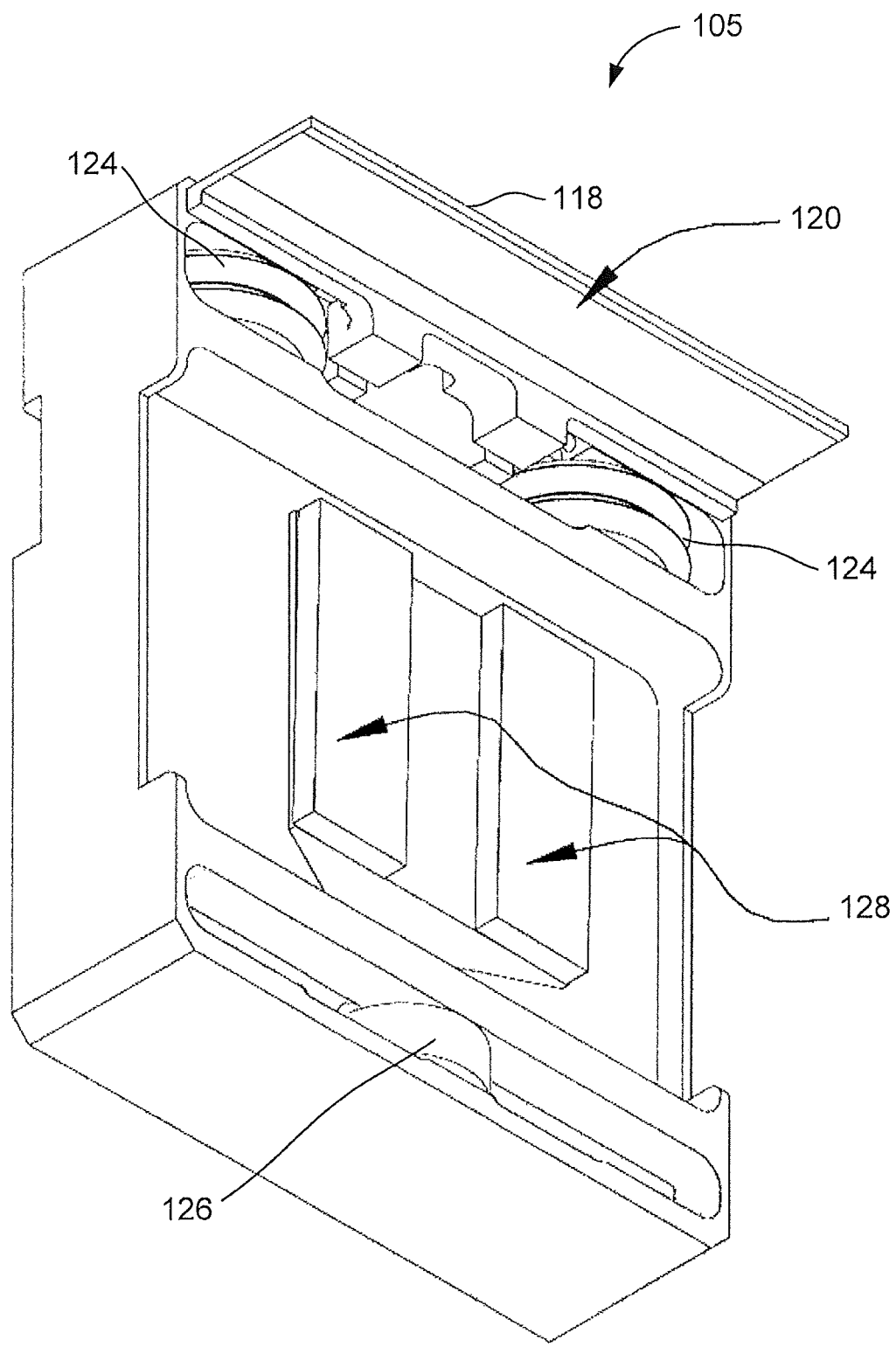
FIG. 8 is a perspective view of a moving element of the conveyor system of FIG. 4, in accordance with a second embodiment.

FIG. 8 shows an alternate moving element 105 that has two "V" shaped bearings 124 and one flat bearing 126. The one flat bearing 126 may provide for a single contact point with the second guide rail 109. The one flat bearing 126 and two shaped bearings 124 (three bearings in total) may provide three point contact to ensure a consistent force of the bearings 124, 126 on the guide rails 108, 109. The magnetic force of the permanent magnets 128 along the Y axis 132 is shared across all three bearings 124, 126 consistently both while the moving element 105 is in motion and when stopped.

Figure 9A:
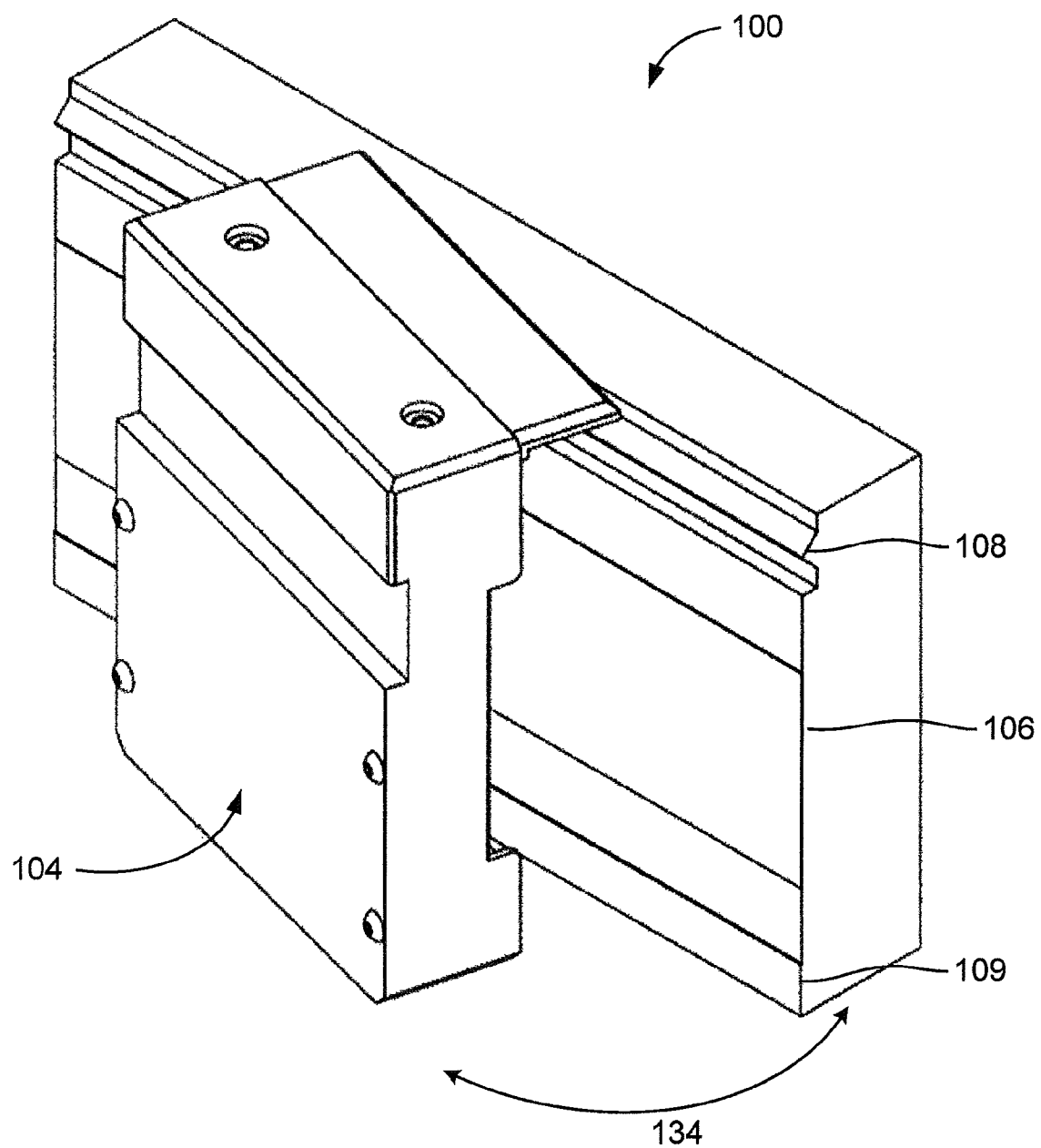
FIG. 9a is a perspective view of the conveyor system of FIG. 4 with the moving element being removed.

FIG. 9a illustrates the moving element 104 being removed from the track 106, in accordance with an embodiment. The first and second set of bearings 124, 126 are removable from the track 106 as the bearings 124, 126 are not locked into the guide rails 108, 109. When the Magnetic force generated between the magnets 128 and the stator armature 112 is overcome, the moving element 104 may be removed from the track 106. For example, in the present embodiment, wherein the moving element uses permanent magnets, the moving element 104 may be pried off (e.g., in a direction 134) of the track 106 without any disassembly of bearings or guide rails or removal of the magnetic force. The moving element 104 may be removed from the track 106 by hand or by using a pry tool.

Figure 9C:
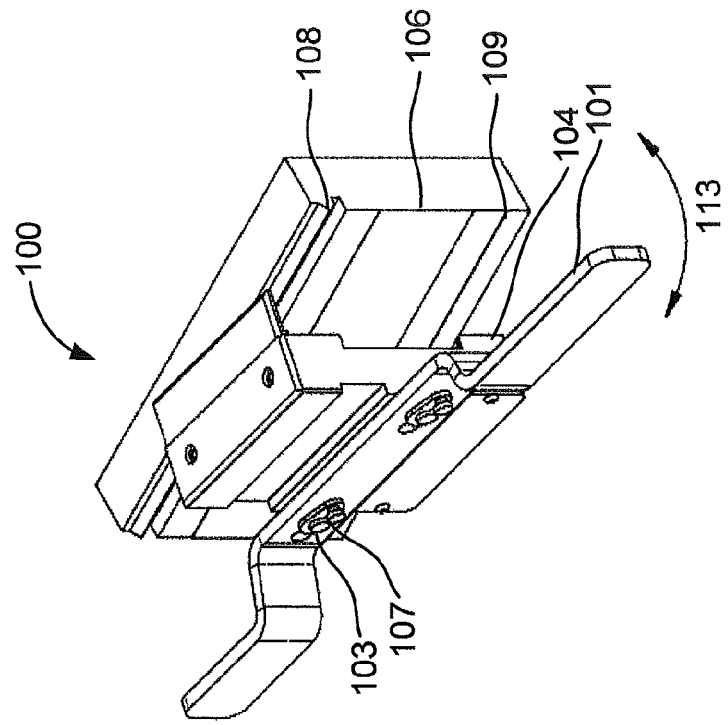
FIGS. 9b and 9c are perspective views of the conveyor system of FIG. 4 with the moving element being removed by a tool.
Figure 9B:
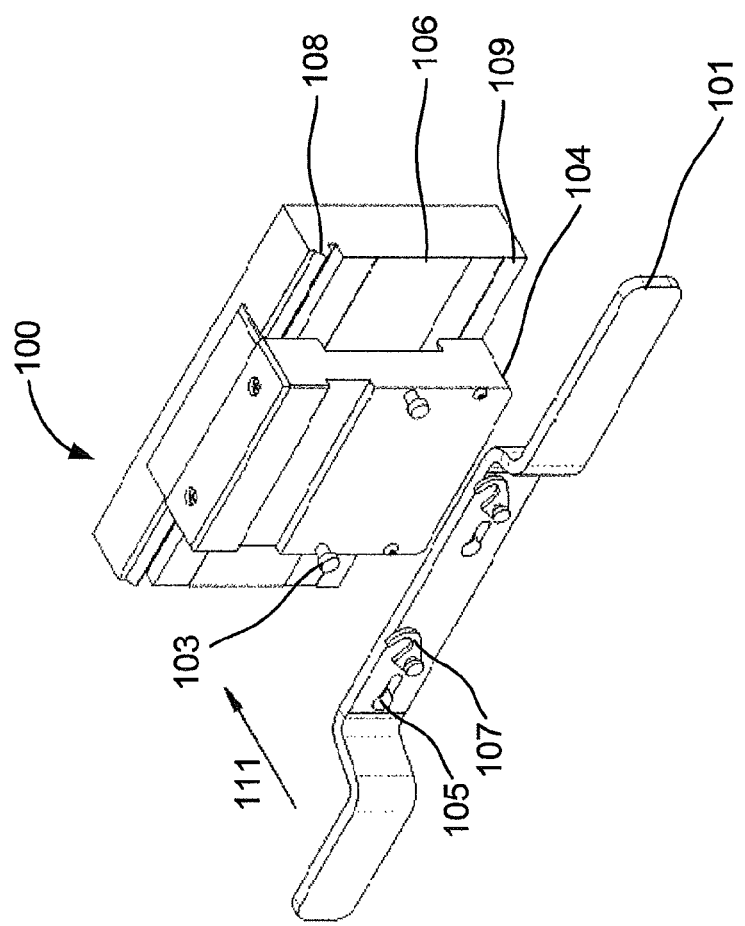

FIGS. 9b and 9c illustrate the moving element 104 being removed from the track 106 using a pry tool, in accordance with an embodiment. In this embodiment, the moving element 104 is configured such that a pry tool 101 may be quickly attached and quickly detached from the moving element 104. The moving element 104 includes one or more pins 103. The pry tool 101 includes a corresponding set of grooves 105 and latches 107. The pry tool 101 is brought towards the moving element 104 in the direction indicated by arrow 111. The pins 103 are inserted into the grooves 105 and the latches 107 are closed to hold the pry tool 101 in place against the moving element 104. In other embodiments, other mechanisms for attaching the pry tool 101 to the moving element 104 may be used. The pry tool 101 is designed to provide extended leverage to overcome the magnetic forces. Once attached, the extended leverage makes it easier for an operator to overcome the magnetic forces to remove the moving element 104 from the track 106 by moving the pry tool 101 in the direction indicated by arrow 113. The pry tool 101 may optionally have offset handles to further increase leverage. The moving element 104 may be coupled to the track 106 by using the above procedure in reverse.

FIGS. 10A, 10B, and 10C are top perspective, bottom perspective, and side views of a moving element 136 having a working surface 138, in accordance with an embodiment. The first set of bearings 124 may be mounted in a way to provide precise positioning of moving elements 104 and attachments to moving elements 104 as shown in FIGS. 10A-10C. The example working surface 138 may accommodate nests to contain parts that move through a manufacturing assembly line. Precise positioning of the working surface 138 may be achieved by having the first set of bearings 124 mounted close to the working surface 138 and on the same plane as the working surface 138. Positioning of the bearings 124 and working surface 138 in this way is intended to minimize the number of stack up tolerances that contribute to precision error. Error may also be reduced by manufacturing components to tight tolerances on the dimensions that influence precision on the working surface 138. The first set of bearings 124 may be mounted to the first guide rail 108 such that stack up errors are minimized.

The sensors 122 and machine readable medium 120 may be mounted close to the guide rail 108 and the first set of bearings 124 to provide precise position of the moving element 104. The machine readable medium 120 may also be mounted on or near the same plane as the working surface 138 such that precise positioning is provided to the working surface 138.

Figure 11:
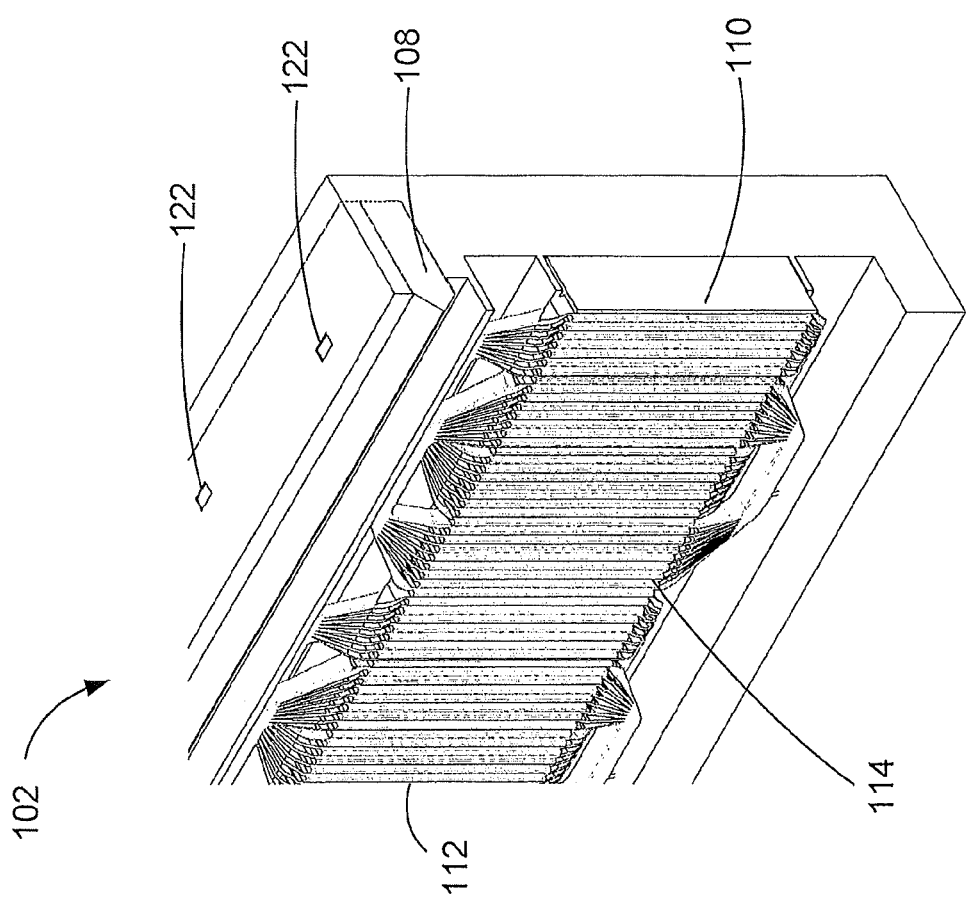
FIG. 11 is a perspective view of the track section having a sensor mounted on the guide rail, in accordance with an embodiment.

FIG. 11 illustrates a perspective view of the track section 102 with a cover plate removed, in accordance with an embodiment. In this embodiment, the sensors 122 are mounted directly on the first guide rail 108 engaged by the first set of bearings 124. Having the sensors 122 mounted directly on the rail 108 that controls precision may minimize error due to thermal expansion and may reduce stack up tolerance errors over sensors that are mounted to a different structural element than the guide rail 108.

Figure 12:
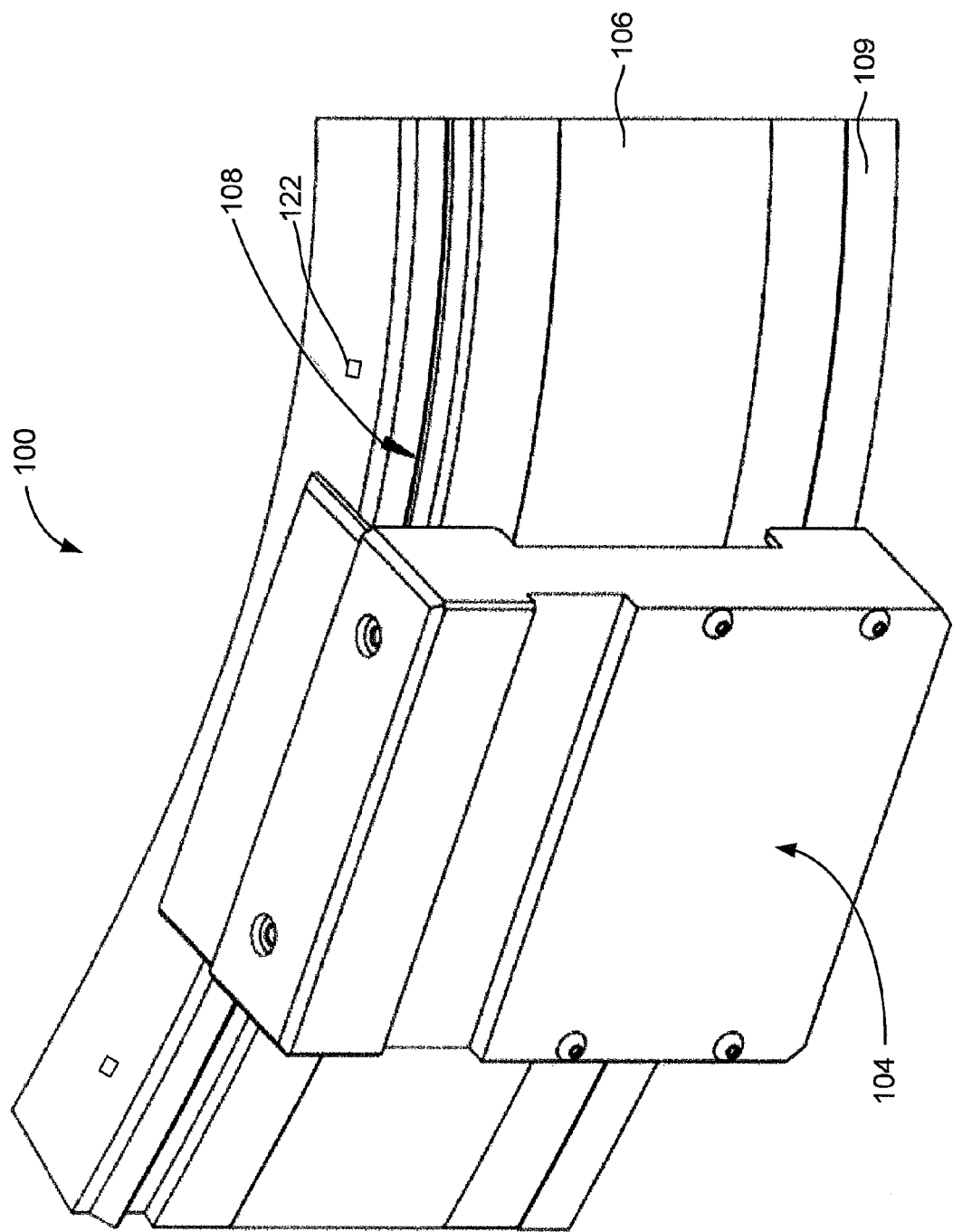
FIG. 12 is a perspective view of a conveyor system having a curved track section, in accordance with an embodiment.

FIG. 12 illustrates a conveyor system 100 having a curvilinear profile, in accordance with a further embodiment. In this particular example, the first set of bearings 124 and the second set of bearings 126 roll over guide rails 108, 109. The conveyor system 100 may not need tight tolerances with rail parallelism and there may not be binding of the moving element 104 and the track 106. It is intended that binding may be avoided due to the second set of bearings 126 having room on the guide rail 109 such that they are free to roll slightly higher or lower on the guide rail 109. Where the track section 102 is curvilinear, the sensors 122 are positioned along the curvilinear profile such that the machine readable medium 120 can be read by the sensors 122 and the readings are then translated from the curvilinear profile to a linear profile, using linear units such as microns, for the purposes of feedback control. Control of the moving element 104 then occurs in the linear profile/linear units.

Figure 13A:
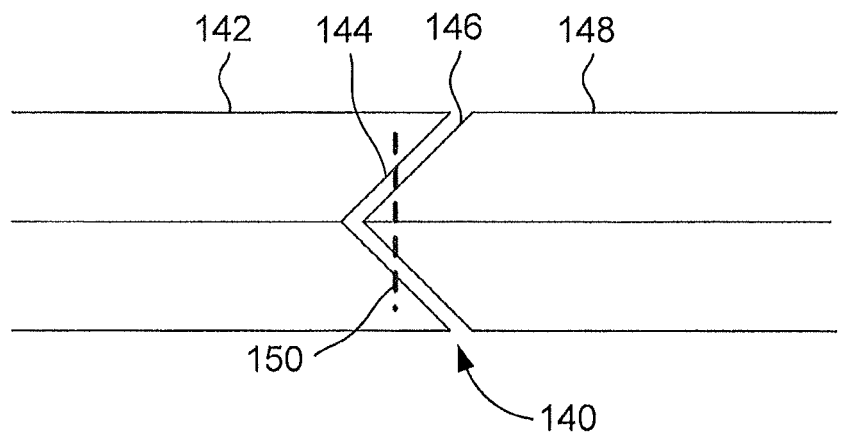
FIGS. 13A and 13B are front and perspective views of a guide rail joint, in accordance with an embodiment.
Figure 13B:
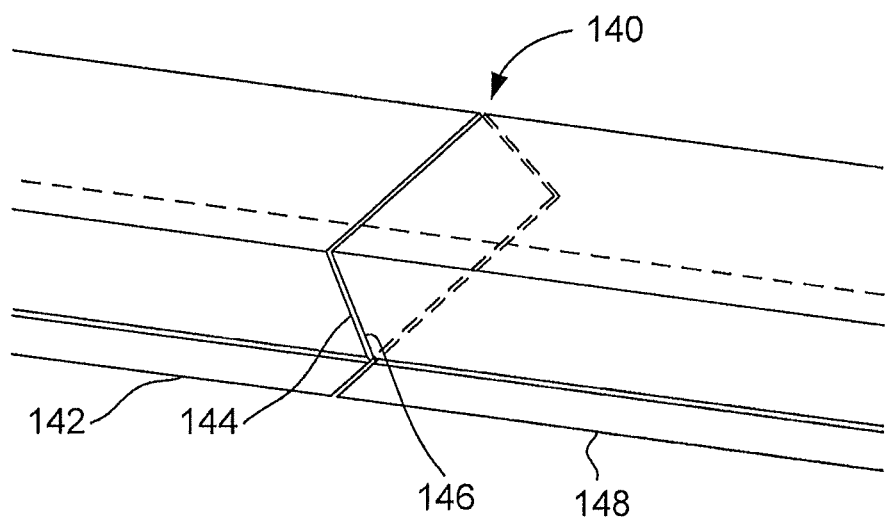

FIGS. 13A and 13B illustrate front and perspective views of a guide rail joint 140, for example, of the mating of two first guide rails 108. The guide rail joint 140 has a first guide rail 142 with an angled end 144 for mating to a corresponding angled end 146 of a guide rail 148 of an adjacent track section. The beveled ends 144, 146 of the guide rails 142, 148 may provide a smooth and effective transition from one track section to another. The moving element 104 is intended to roll smoothly from one track section 102 to the next due to a positive line of contact 150 of the bearings 124 across the guide rail joint 140.

The guide rail joint 140 may be advantageous to a straight mating of adjacent track sections. The guide rail joint 140 may provide a stable riding surface across the joint and avoid causing the bearings 124 to dip into a gap reducing vibration and wear. Further, the guide rail joint 140 may be more tolerant to alignment variation than a straight joint as there is a gradual handoff region verses a straight joint. The line of contact 150 has stable contact on either guide rail 142, 148 as there is an overlapping range within the guide rail joint 140 such that physical handoff can occur.

Figure 14B:
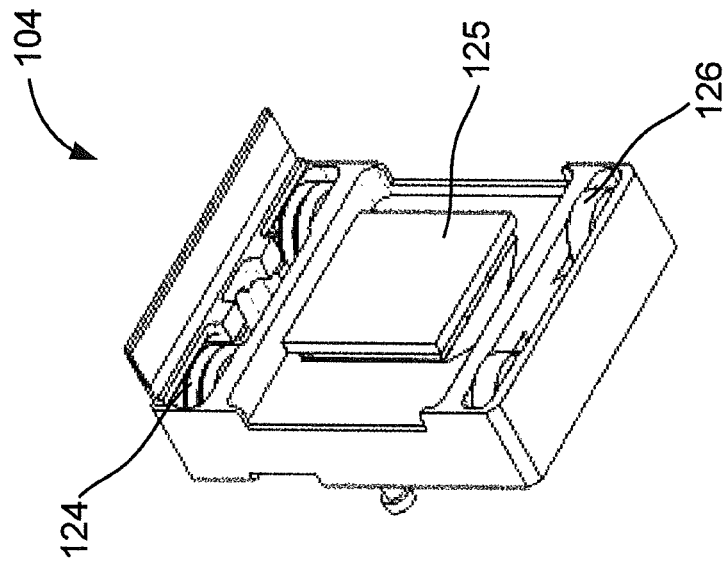
FIGS. 14A and 14B are perspective views of a moving element with a magnetic shunt, in accordance with an embodiment.
Figure 14A:
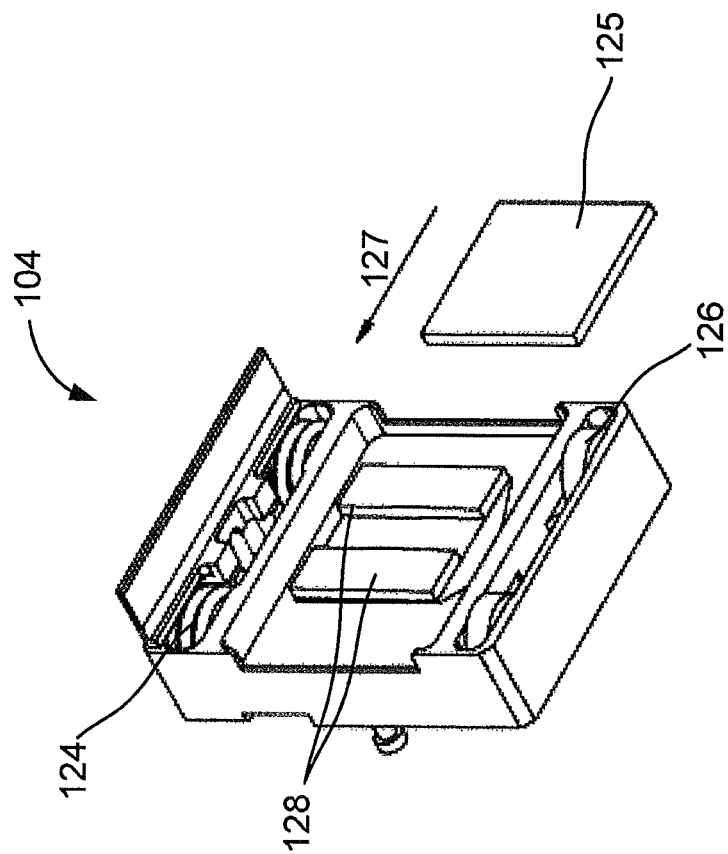

FIGS. 14A and 14B illustrate perspective views of a moving element 104 with a magnetic shunt 125, in accordance with an embodiment. In an embodiment, a magnetic shunt 125 may be provided to the moving element 104. A magnetic shunt 125 may be a metal element that is placed in front of the moving element 104 which is used to complete the magnetic circuit of the magnetic elements 128; for example, the magnetic shunt 125 may be a metal sheet. In some cases, the magnetic shunt 125 may be slid in front of the magnetic elements 128, for example in the direction of arrow 127, as magnetic sheer forces may be easier to overcome than forces perpendicular to the magnetic elements 128. The magnetic shunt 125 may be placed on the moving element 104 manually or automatically. It is intended that placing a magnetic shunt 125 in front of the magnetic elements 128 may allow easier handling, greater reliability and increased safety when the moving element 104 is removed from the track 102 or when the moving element 104 moves to a part of the conveyor system 100 that does not use magnetic forces in the same way. In certain cases, the magnetic shunt 125 may allow the moving element to avoid unintentionally interacting with metallic or magnetic elements when the moving element is no longer coupled to the track 102. In an example, there may be a shunt station in the conveyor system 100 that automatically places a magnetic shunt 125 on a moving element 104 when the moving element 104 arrives at the shunt station. With a magnetic shunt 125 in place, the moving element 104 may be removed from the track 102 or move onto another section of the conveyor system 100, for example, a conventional belt conveyor.

The conveyor system 100 may not require added preload hardware or preload adjustments to keep the first set of bearings 124 in contact with the first guide rail 108 or the second set of bearings 126 in contact with the guide rail 109 as a preload is achieved by the magnetic force generated between the magnetic elements 128 and the stator armature 114.

The conveyor system 100 is intended to achieve cost effective high precision positioning. The first set of bearings 124 control precision on the X axis 130, the Y axis 132, the Z axis 135, and in rotation about the Y axis 132 and Z axis 135. The guide rails 109 and the second set of bearings 126 control rotation about the X axis 130 with less sensitivity to variation. The number of bearing contact points that have an influence on precision is minimized. The magnetic force of the magnetic elements 128 is used for both thrust along the track 106 and bearing capture to keep the bearings 124, 126 biased to the guide rails 108, 109. The same magnetic elements 128 used to generate thrust along the X axis 130 of the track 106 also captures the bearings 124, 126 on the guide rails 108, 109 with the magnetic force along the Y axis 132. Other than the magnetic force along the Y axis 132, no other elements are needed to capture the bearings 124, 126. The magnetic force also assists with taking up backlash in the conveyor system 100. Mechanical backlash may be present between the bearings 124, 126 and the guide rails 108, 109, between the bearings 124, 126 and a shaft supporting the bearings 124, 126 on the moving element 104. The conveyor system 100 may have fewer parts manufactured to tight tolerances than in conventional systems in order to achieve high precision movement and positioning of the moving element 104.

While the conveyor system 100 is shown with the track 106 in an upright or vertical orientation, it will be understood that the conveyor system 100 may be in any desired orientation while achieving at least one advantage described herein.

In the preceding description, for purposes of explanation, numerous details are set forth in order to provide a thorough understanding of the embodiments. However, it will be apparent to one skilled in the art that these specific details may not be required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A moving element for a linear motor conveyor the moving element comprising:
    a moving element magnetic element; and
    a first bearing, wherein the first bearing engages with a first guide rail of a linear motor conveyor track to support the moving element in both a direction of travel along the track (x-axis) and in a direction perpendicular to the direction of travel along the track (z-axis) that is also perpendicular to a magnetic force between a track magnetic element and the moving element magnetic element (y-axis) such that the moving element is substantially supported on the track by the magnetic force to retain the moving element on the track;
    wherein, absent the magnetic force, the moving element is removable from the track without mechanical disassembly of the first bearing or the first guide rail.

2. The moving element of claim 1 wherein the magnetic force laterally retains the moving element on the track.

3. The moving element of claim 1 wherein the first bearing has a "V" or "U" shaped profile to engage with a "V" or "U" shaped profile of the first guide rail.

4. The moving element of claim 1 further comprising a second bearing with a flat profile configured to engage a second guide rail of the track.

5. The moving element of claim 4, wherein the second bearing comprises at least one wheel bearing adapted to roll higher or lower on the second guide rail to adapt to any non-parallelism of the first guide rail.

6. The moving element of claim 5, wherein the first bearing, the second bearing, or both, comprise a set of bearings.

7. The moving element of claim 1, wherein the magnetic force is adjusted to capture the moving element on the track.

8. The moving element of claim 1, wherein the magnetic force is adjusted to move the moving element on the track.

9. The moving element of claim 1, wherein the magnetic force is further configured to take up mechanical backlash.

10. A linear motor conveyor track comprising:
    a first magnetic element for generating a magnetic field; and
    a first guide rail;
    wherein the first guide rail engages a first bearing of a moving element to support the moving element in both a direction of travel along the track (x-axis) and in a direction perpendicular to the direction of travel along the track (z-axis) that is also perpendicular to a magnetic force between the first magnetic element and a second magnetic element located on the moving element (y-axis) such that the moving element is substantially supported on the track by the magnetic force to retain the moving element on the track;
    wherein, absent the magnetic force, the moving element is removable from the track without mechanical disassembly of the first bearing or the first guide rail.

11. The track of claim 10 wherein the magnetic force laterally retains the moving element on the track.

12. The track of claim 10, wherein the first guide rail has a "V" or "U" shaped profile.

13. The track of claim 10 further comprising a second guide rail with a flat profile, wherein the moving element comprises a second bearing with a flat profile for engaging the second guide rail.

14. The track of claim 13, wherein the second bearing comprises at least one wheel bearing adapted to roll higher or lower on the second guide rail to adapt to any non-parallelism of the first guide rail.

15. The track of claim 13, wherein the track and guide rails are curved.

16. The track of claim 10, wherein the magnetic force is adjusted to capture the moving element on the track.

17. The track of claim 10, wherein the magnetic force is further configured to take up mechanical backlash.

18. The track of claim 10, wherein the first guide rail has an angled end for mating with a guide rail of an adjacent track section.

19. The track of claim 10 wherein the magnetic force is continuously adjusted to capture the moving element on the track.

20. A linear motor conveyor system comprising:
a moving element comprising a magnet, a first bearing and a second bearing;
a track comprising a magnetic element for generating a magnetic field, a first guide rail having a non-flat profile for engagement with the first bearing, and a second guide rail having a flat profile for engagement with the second bearing, wherein the magnetic field attracts the moving element to the track and supports the moving element on the track such that the magnetic field takes up backlash of the bearings and the guide rails, and absent the magnetic force, the moving element is removable from the track without mechanical disassembly of the bearings or the guide rails, and wherein the first and second guide rails guide but do not substantially support the moving element.

* * * * *